(12) United States Patent
Jones et al.

(10) Patent No.: US 7,389,939 B2
(45) Date of Patent: Jun. 24, 2008

(54) OPTICALLY VARIABLE SECURITY FEATURES HAVING COVERT FORENSIC FEATURES

(75) Inventors: Robert Jones, Andover, MA (US); Daoshen Bi, Boxborough, MA (US)

(73) Assignee: Digimarc Corporation, Beaverton, OR (US)

(*) Notice: Subject to any disclaimer, the term of this patent is extended or adjusted under 35 U.S.C. 154(b) by 719 days.

(21) Appl. No.: 10/673,048

(22) Filed: Sep. 26, 2003

(65) Prior Publication Data

US 2005/0067497 A1    Mar. 31, 2005

(51) Int. Cl.
    *G06K 19/06*      (2006.01)
(52) U.S. Cl. .................................. 235/494; 235/487
(58) Field of Classification Search .................. 235/494, 235/487
See application file for complete search history.

(56) References Cited

U.S. PATENT DOCUMENTS

| | | | |
|---|---|---|---|
| 3,929,701 A | 12/1975 | Hall et al. | |
| 3,949,501 A | 4/1976 | Andrews et al. | |
| 4,027,345 A | 6/1977 | Fujisawa et al. | |
| 4,082,873 A | 4/1978 | Williams | |
| 4,121,003 A | 10/1978 | Williams | |
| 4,184,701 A | 1/1980 | Franklin et al. | |
| 4,614,619 A | 9/1986 | Shannon | |
| 4,637,896 A | 1/1987 | Shannon | |
| 4,773,677 A | 9/1988 | Plasse | |
| 4,876,123 A | 10/1989 | Rivera et al. | |
| 5,169,707 A | 12/1992 | Faykish | |
| 5,310,222 A * | 5/1994 | Chatwin et al. ............... | 283/86 |
| 5,380,695 A | 1/1995 | Chiang et al. | |
| 5,629,093 A | 5/1997 | Bischof et al. | |
| 5,658,411 A | 8/1997 | Faykish | |
| 5,660,925 A | 8/1997 | Cooley et al. | |
| 6,146,741 A | 11/2000 | Ogawa et al. | |
| 6,183,018 B1 | 2/2001 | Braun et al. | |
| 6,284,337 B1 | 9/2001 | Lorimor et al. | |
| 6,372,341 B1 | 4/2002 | Jung et al. | |
| 6,473,516 B1 | 10/2002 | Kawaguchi et al. | |
| 6,474,695 B1 | 11/2002 | Schneider et al. | |
| 6,660,368 B2 | 12/2003 | Cooley | |
| 6,817,530 B2 | 11/2004 | LaBrec et al. | |
| 6,827,277 B2 | 12/2004 | Bloomberg et al. | |
| 7,063,264 B2 | 6/2006 | Bi et al. | |
| 7,143,950 B2 | 12/2006 | Jones et al. | |

FOREIGN PATENT DOCUMENTS

JP      63-146909      6/1988

\* cited by examiner

*Primary Examiner*—Lisa Caputo

(57) ABSTRACT

The invention relates to security feature for identification documents, and in particular to A security feature, comprising a first covert layer comprising a first covert material that is not visible to a human eye under except under a first condition, the first covert layer further comprising a material constructed and arranged to produce, upon an attempted intrusion into any part of the security feature, a first effect that is visible at least under the first condition; an optically variable layer having first and second sides, the first side being disposed adjacent the first covert layer, the optically varying layer being constructed and arranged to cover at least a portion of the first covert layer; and a second covert layer disposed adjacent to the second side of the optically variable layer, the second covert layer being constructed and arranged to cover at least a portion of the optically variable layer, the second covert layer comprising a second covert material that is visible to the human eye only at a second condition.

32 Claims, 13 Drawing Sheets

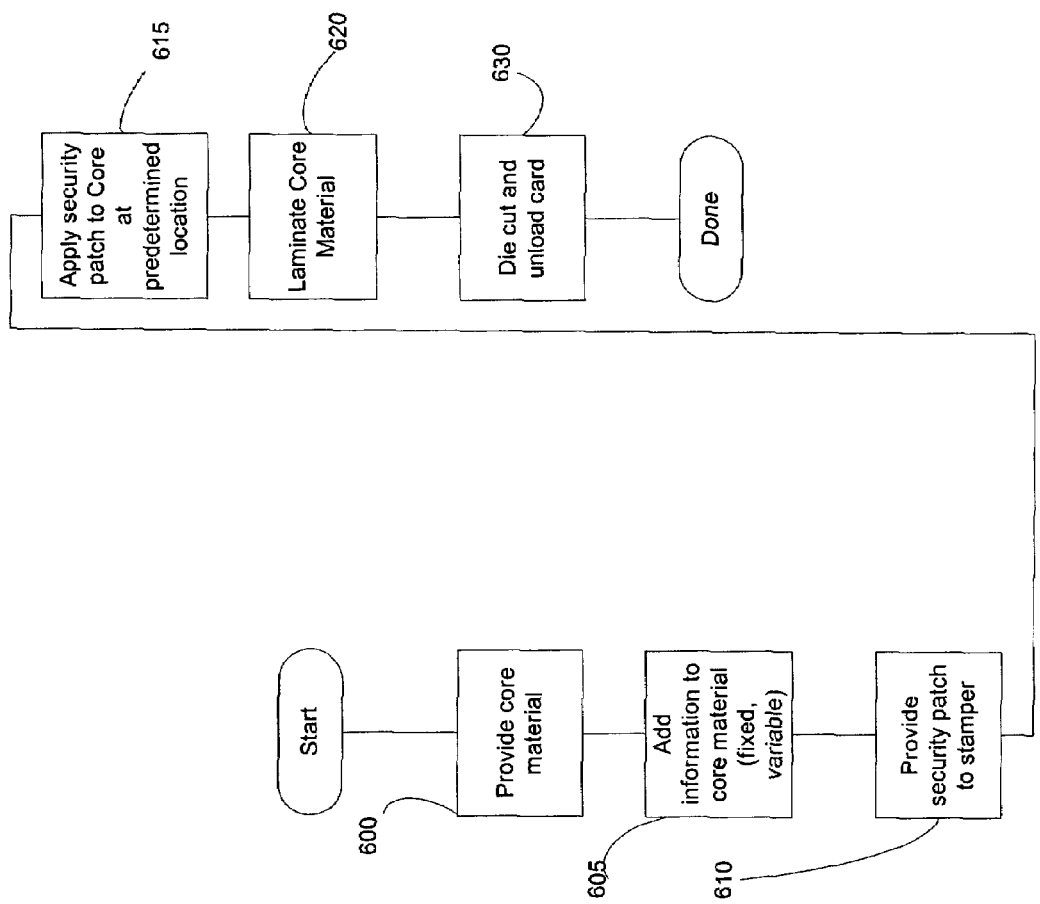

OPTICALLY VARIABLE SECURITY FEATURES HAVING COVERT FORENSIC FEATURES

RELATED APPLICATION DATA

This application is related to the following U.S. patent applications:

Identification Document (Application No. 60/471,429, filed May 16, 2003, inventors Robert Jones, Brian Labrec, Daoshen Bi, and Thomas Regan).

Use of Pearlescent and Other Pigments to Create Security Documents (application Ser. No. 09/969,200, Inventors Bentley Bloomberg and Robert L. Jones, filed Oct. 2, 2001 now U.S. Pat. No. 6,827,277)).

Identification Card Printed With Jet Inks and Systems and Methods of Making Same (application Ser. No. 10/289,962, Inventors Robert Jones, Dennis Mailloux, and Daoshen Bi, filed Nov. 6, 2002).

Contact Smart Cards Having a Document Core, Contactless Smart Cards Including Multi-Layered Structure, PET-Based Identification Document, and Methods of Making Same (application Ser. No. 10/329,318, filed Dec. 23, 2002—Inventors Robert Jones, Joseph Anderson, Daoshen Bi, Thomas Regan, and Dennis Mailloux (now U.S. Pat. No. 6,843,422)).

Ink with Cohesive Failure and Identification Document Including Same (application Ser. No. 10/329,315, filed Dec. 23, 2002—Inventors Robert Jones and Bentley Bloomberg (now U.S. Pat. No. 7,143,950)).

Laser Engraving Methods and Compositions, and Articles Having Laser Engraving Thereon (application Ser. No. 10/326,886, filed Dec. 20, 2002—Inventors Brian Labrec and Robert Jones).

Multiple Image Security Features for Identification Documents and Methods of Making Same (application Ser. No. 10/325,434, filed Dec. 18, 2002—Inventors Brian Labrec, Joseph Anderson, Robert Jones, and Danielle Batey (now U.S. Pat. No. 6,817,530)).

Covert Variable Information on Identification Documents and Methods of Making Same (application Ser. No. 10/330, 032, filed Dec. 24, 2002—Inventors: Robert Jones and Daoshen Bi (now U.S. Pat. No. 7,063,264)).

Systems, Compositions, and Methods for Full Color Laser Engraving of ID Documents (application Ser. No. 10/330, 034, filed Dec. 24, 2002—Inventor Robert Jones).

Laser Etched Security Features for Identification Documents and Methods of Making Same (application Ser. No. 10/330,033, filed Dec. 24, 2002—Inventors George Theodossiou and Robert Jones).

Image Processing Techniques for Printing Identification Cards and Documents (application Ser. No. 10/411,354, filed Apr. 9, 2003—Inventors Chuck Duggan and Nelson Schneck).

Identification Card Printer-Assembler for Over the Counter Card Issuing (application Ser. No. 10/436,729, filed May 12, 2003—Inventors Dennis Mailloux, Robert Jones, and Daoshen bi).

Identification Document and Related Methods (Application No. 60/421,254, —Inventors: Geoff Rhoads, et al).

Identification Document and Related Methods (Application No. 60/418,762, —Inventors: Geoff Rhoads, et al).

Optically Variable Devices with Embedded Data for Authentication of Identity Documents (Application No. 60/459,284, filed Mar. 31, 2003—Inventor Robert Jones).

Optically Variable Devices with Encrypted Embedded Data for Authentication of Identity Documents (Application No. 60/463,660, filed Mar. 31, 2003—Inventors Robert Jones and Leo Kenen).

Image Processing Techniques for Printing Identification Cards and Document (Application No. 60/463,659, filed Mar. 31, 2003—Inventors Robert Jones and Brian Labrec.

Each of the above U.S. Patent documents is herein incorporated by reference in its entirety. The present invention is also related to U.S. patent application Ser. No. 09/747,735, filed Dec. 22, 2000 (now U.S. Pat. No. 6,923,378), Ser. No. 09/602,313, filed Jun. 23, 2000 (now U.S. Pat. No. 6,752, 432), and Ser. No. 10/094,593, filed Mar. 6, 2002, U.S. Provisional Patent Application No. 60/358,321, filed Feb. 19, 2002, as well as U.S. Pat. No. 6,066,594. Each of the above U.S. Patent documents is herein incorporated by reference in its entirety.

Each of the above U.S. Patent documents is herein incorporated by reference in its entirety.

TECHNICAL FIELD

The present invention generally relates to identification and security documents, and in particular, relates the formation a covert security feature such as a fluorescing, ultraviolet, infrared, thermachromic and/or optical variable feature on such documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiver, to produce a continuous tone image. D2T2 can have an increased cost as compared to other methods, however, because of the special dyes needed and the cost of D2T2 ribbons. Also, the quality of D2T2-printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

UV Security Features in ID Documents

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called Pola- Prime-UV™. PolaPrime-UV™ is a type of security feature. One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, PolaPrime-UV™ has been a reliable authenticator for genuine identification documents.

Printing of Covert Materials Such as UV

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tones) image and the dye sublimation panel produces a monochromatic (or shaded) image.

Optically Variable and Tamper Evident Features

As color photocopiers and other similar imaging systems (e.g., scanners) have increased in quality, availability, and popularity, there has been a corresponding increase in the counterfeiting of security documents such as bank notes, passports and identification cards. Thus, issuers and creators of legitimate security documents have been attempting to add security features to the documents that are difficult to obtain and/or difficult (or impossible) to photocopy or scan. Such security features can also serve to enhance the perceptions and resistance to simulation of existing features on the security documents.

For example, it is known to provide on such security documents optically variable features (which generally cannot which cannot be accurately reproduced by a photocopier or scanner because such features can be invisible to, or viewed differently, by a photocopier. Because some types of photocopying processes reflect high energy light off an original document containing the image to be copied, from a single viewing angle, a security feature may have a different appearance depending on angle at which it is viewed, or a different appearance in reflected and transmitted light.

Color shifting and other optically variable pigments, inks, dyes, and colorants (collectively "optically variable media") have a feature of appearing to change color as the viewing angle of an observer changes (or as the angle of incident light striking the media changes). Optically variable media have been used on security documents, such as identification cards, credit cards, checks, title document, currency, etc. The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce most types of optically variable media, helping to reduce unauthorized reproduction or counterfeiting of such documents. Optically variable media also can be used with many other different types of articles, such as consumer goods (e.g., toys, cars), paper products (e.g., greeting cards, magazines), and in the fine arts (e.g., works of art).

Several methods exist to create optically variable media and to apply such media to security documents. One method involves dispersing in a medium (e.g., paint or ink) a plurality of relatively small particles (typically flakes) that have specific optical properties. One example of a particle is a particle comprising a plurality of thin film layers, each film having a particular color and/or optical property. Another example of a particle that can have an optically varying appearance is described in a commonly assigned patent application Ser. No. 09/969,200, entitled "Use of Pearlescent and Other Pigments to Create Security Documents", by Bentley Bloomberg and Robert L. Jones, filed Oct. 2, 2001 (hereinafter "the '200 application"), (now U.S. Pat. No. 6,827,277), the contents of which are incorporated by reference herein in their entirety.

U.S. Pat. No. 6,827,277 describes a media having optically variable properties which includes, in one embodiment, particles comprising flat, irregularly shaped mica platelets coated with titanium dioxide and/or iron oxide. These particles, when dispersed in a media, can give a generally "pearlescent" effect, with smaller particles producing a "satin" effect and larger particles producing a "glitter" effect. In many instances, optically variable media are incorporated into a material such as a laminate layer or overlaminate layer, providing an optically variable indicia that overlays other information on the card. Generally, such an optically variable indicia contains "fixed" data (information that is the same from card to card).

Another method of providing optically variable materials is through the use of certain types of liquid crystals. It is known that certain liquid crystal materials exhibit a difference in color when viewed in transmission and reflection as well as an angularly dependent colored reflection. A liquid crystal is a type of molecule that, when heated above its melting point, can enter a state that exhibits characteristics of both isotropic melt and an ordered crystal. In the so-called liquid crystal state, a liquid crystal molecule can be moving like a liquid but still exhibit degrees of molecular order normally only found in solid crystals. As a result, the liquid crystal can have some physical properties which are angle dependent in the liquid crystalline state, including refractive index. This can enable the liquid crystal to have unique optical properties, including a varying appearance as the viewing angle changes, because of interference effects that cause reflection of certain spectral components of incident light and transmission of the remaining spectral components.

Liquid crystal materials have been incorporated into documents, identification cards and other security elements with a view to creating distinctive optical characteristics. U.S. Pat. No. 4,637,896 provides further information about polymeric liquid crystals, and the disclosure of this patent is hereby incorporated by reference.

It will be appreciated that the security of an identification document will be at least partially dependent upon the particular structure and properties of the layers and the ease with which a successful intrusion can be accomplished. In the case, for example, of the dye image-receiving element of the U.S. Pat. No. 4,738,949, there is produced a monolithic ID card, by which is meant that the background information and the photograph or other personalized information are contained in the same layer. It is indicated in the patent (col. 2, lines 63-66) that, in this way, tampering with the photograph will destroy the background information and forgeries can be prevented.

In U.S. Pat. No. 5,261,987, reference is made to the ID cards of the aforesaid U.S. Pat. No. 4,738,949 and to the lamination of a transparent laminate (employing adhesive) onto the image-bearing surface. It is indicated that attempts to delaminate or peel apart the double composite laminate caused the thermally-transferred dye image to be lifted off the polycarbonate dye-receiver layer by virtue of the strong adhesion provided by the adhesive. It is further disclosed that, in the case of the lamination between polyvinyl chloride sheets of a support sheet carrying a polycarbonate surface having personalized and background information thereon, the incorporation of the support sheet into the ID card renders the card susceptible to being delaminated and altered. There is, thus, disclosed in U.S. Pat. No. 5,261,987 a method of increasing tamper resistance whereby personalized information is printed (by thermal dye transfer printing) onto the exposed surface of a polycarbonate receiver sheet and the polycarbonate receiving layer of the receiver element is then adhered and transferred to a cardstock material pre-printed with background information.

Technologies exist that combine both optically variable properties and tamper evident properties. One example is a type of prefabricated coating of a liquid crystalline material that is available as the ADVANTAGE product available from Advantage ID Technologies, Inc., of Lancaster, Pa., which is part of Applied Optical Technologies, plc, of Parkton, Md. and the United Kingdom. The ADVANTAGE product is an optically variable security coating that can be used to protect documents, components, products, etc., from counterfeiting, alteration, and compromise. The ADVANTAGE material is provided in the form of security laminates (heat activated) and security labels. In at least one form, the ADVANTAGE material comprises a polymeric liquid crystal layer and a tamper evident layer.

Using the ADVANTAGE product, anti-counterfeiting substances can be embedded in the card or applied as a laminate, producing an image that changes color (in a trimodal manner, from transparent to orange to green) as a card is tilted. This trimodal color change is difficult to impossible for known copiers, scanners, and desktop publishing systems to copy. The image itself can be designed to be easily seen by an unaided naked eye. If an attempt is made to tamper with a document to which the ADVANTAGE product has been applied (e.g., as a security feature), chemical coatings that are part of the ADVANTAGE product fracture into microfragments, making it difficult to tamper with the security feature without destroying the security document to which it was applied or in which it was embedded. Often, evidence of such tampering can be seen by an unaided naked eye (or a naked eye aided by the use of an ultraviolet light source, if the tamper evident layer is a UV layer). In one example, the chemical coating is made from a material capable of fluorescing under UV light, such that the fractured UV coating is visible only under UV light.

Although it is known to use optically variable media on security documents, use of such media can sometimes have limitations. For example, many optically variable media are substantially opaque, which can limit their application and use on particular types of security documents, as well as the type and/or design of indicia that are printable with such optically variable media. For example, the relative opacity of many optically variable media means that an indicium (printed with most optically variable media) that is intended to overlay other information generally has an "open" type of design (such as a design with widely spaced lines, or significant spaces between lines/dots), to permit information overlaid by the indicia to be substantially perceived.

Further, for some types of security document (e.g., drivers licenses, identification cards), the issuer wishes to provide a lot of information in a relatively small card area. In particular, it often is desirable to print information such as images of the bearer on a card. Such images typically are not "open" enough to be usable with most conventional optically variable media. Thus, applying an optically variable media that is opaque to such a card and printing an image with it means that it can be difficult to put other information in that area that was printed/overlaid using the optically variable and still have the non-optically variable information be perceivable to an unaided human eye (for authentication or other purposes).

It also would be desirable to ensure that the optically variable feature is further protected by additional covert security elements that are very difficult to obtain and to embed within the laminates of an identification document. For example, infrared media, such as inks, pigments, and dyes, are invisible unless viewed using a special light source and also can be very difficult for a counterfeiter to obtain and to properly apply into identification documents, and would be advantageous to use in a security feature application. Specific types of ultraviolet inks, which are "tuned" to fluoresce at only particular ultraviolet light wavelengths, also can be advantageous in a security feature application. They also will be difficult to view without access to and use of the particular light source. Use of such difficult to obtain media also can act as a forensic feature, because the sources for such media are limited and sales and access are often controlled, thus enabling an investigator to better identify the source of a given infrared, ultraviolet, or other covert media.

The ID document counterfeiter remains surprisingly resourceful. Improvements are needed to stay ahead of the counterfeiter. One counterfeiting technique involves a de-lamination attack. Consider an ID document that includes a printed substrate covered by a laminate layer. A de-lamination attack removes the laminate layer, sometimes with the aid of heat, to access information printed on the substrate. Once revealed, the counterfeiter can alter the printed information and reuse the substrate or laminate. It would be further desirable to be able to readily detect whether such tampering and/or a forgery has occurred with respect to an identification document and/or any indicia on it. For example, because variable indicia (e.g., a birthdate) is a frequent target of alteration and/or other types of fraud, it would be desirable if a security feature could be constructed and arranged so as to show if an alteration attempt was made on a given indicia.

Some ID documents are susceptible to this type of attack. Consider the ID document including a substrate, ink applied to the substrate (or laminate layer) to convey information and a laminate layer covering the ink and substrate. Conventional inks generally include a strong adhesion to either a document substrate or to a laminate. A counterfeiter can use this design characteristic (adhesion) to his advantage. Upon de-lamination, the ink may adhere to the substrate layer or to a laminate layer. Regardless, the printed information is typically preserved on at least one layer and may be used again. (For example, if the ink adheres to a laminate, the counterfeiter can reuse the laminate. Or if the ink adheres to the substrate, the counterfeiter can perhaps alter the information by applying additional ink, or simply reuse the remaining information on the substrate.).

U.S. Pat. No. 5,380,695, herein incorporated by reference, discloses an identification document designed to help deter intrusion attempts. This patent describes an image-receiving element that includes a support, a polymeric security layer including printing, and an image-receiving layer. The polymeric security layer is designed such that its cohesivity is less than its adhesivity for each layer that is contiguous thereto. A printed security pattern is hopefully destroyed through partitioning of the security layer during an attempted de-lamination of the image-receiving layer from the image-receiving element.

To provide these and other advantages, the invention described herein proposes a unique security feature that combines an optically variable feature, a forensic feature, and a tamper evident feature. One portion of the security feature is both visible and at least substantially translucent in visible light, enabling it to be applied to virtually any portion of an identification document, including being overlaid over other information on an identification document. At least one other portion of the security feature is visible only in a light that is not visible to the naked eye, such as UV or IR light. In one embodiment, the security feature comprises a first covert layer, an optically variable layer, and a second covert layer. The first covert layer comprises a patch of first material applied over a first side of the optically variable layer, where the first material comprises a first covert material that is visible to the naked eye only under at least one predetermined light wavelength. The presence of the first covert material is generally not known to the public. The optically variable layer comprises a layer of material capable of presenting a varying appearance depending on the angle from which the optically variable material is viewed. The second covert layer is disposed along a second side of the optically variable layer and comprises a second layer of a second covert material that breaks upon intrusion.

Advantageously, the security feature is overlaid at least partially over a variable indicia on the identification document. If an attempt is made to delaminate or otherwise remove the security feature, a portion of the security feature fractures, to provide tamper evidence.

In one embodiment the invention provides a security feature, comprising a first covert layer, an optically variable layer, and a second covert layer. The first covert layer comprises a first covert material that is not visible to a human eye under except under a first condition. The first covert layer further comprises a material constructed and arranged to produce, upon an attempted intrusion into any part of the security feature, a first effect, such damaging breaking, cracking, rupturing, splitting, fracturing, splintering, changing color, changing texture, shattering, and destroying, that is visible at least under the first condition. The optically variable layer has first and second sides, the first side being disposed adjacent the first covert layer. The optically varying layer is constructed and arranged to cover at least a portion of the first covert layer. The optically variable layer comprises an optically variable material, such as a polymeric liquid crystal. The second covert layer is disposed adjacent to the second side of the optically variable layer. The second covert layer comprises a second covert material, such as an infrared, an ultraviolet, and/or a thermachromic material, that is visible to the human eye only at a second condition, such as at least one of predetermined wavelength of light in the infrared range, a predetermined wavelength of light in the ultraviolet range, and a predetermined temperature. The second covert layer is constructed and arranged to cover at least a portion of the optically variable layer.

In one embodiment, the first covert layer is operably coupled to the optically variable layer and is constructed and arranged such that an attempted intrusion into the first covert layer causes damage to at least one of the first covert layer and the optically variable layer. In one embodiment, the first and second covert layers and the optically variable layer are constructed and arranged such that an attempted intrusion into the security feature causes damage to at least a portion of at least one layer of the first covert layer, second covert layer, and optically variable layer,.

In one embodiment, the ADVANTAGE material is used for at least one of the optically variable layer and the first covert layer.

In another aspect, the invention provides an identification document, comprising a core layer, a security feature, and a first laminate layer. The core layer, which can, for example, be TESLIN, has first and second sides. The security feature has first and second sides and has a first side operably coupled to a first side of the core layer. The first laminate layer operably coupled to the second side of the security feature. The security feature comprises a first covert layer, a second covert layer, and an optically variable layer. The first covert layer comprises a first covert material that is not visible to a human eye under except under a first condition, the first covert layer further comprising a material constructed and arranged to produce a first effect that is visible at least under the first condition upon an attempted intrusion into the first covert layer. The optically variable layer comprises an optically variable material and has first and second sides, the first side being disposed adjacent the first covert layer, the optically varying layer being constructed and arranged to cover at least a portion of the first covert layer. The second covert layer is disposed adjacent to the second side of the optically variable layer, the second covert layer being constructed and arranged to cover at least a portion of the optically variable layer. The second covert layer comprises a second covert material that is visible to the human eye only at a second condition.

In another embodiment, the invention provides method of making an identification document. A first laminate layer having first and second sides is provided. A first cover layer having first and second sides is disposed adjacent to the first side of the first laminate layer. The first side of an optically variable layer having first and second sides is arranged adjacent to the second side of the first covert layer. The first side of a second covert layer having first and second sides is placed adjacent to the second side of the optically variable layer. The first side of a core layer having first and second sides is aligned to the second side of the second covert layer. The first laminate layer, first covert layer, optically variable layer, second covert layer, and core layer are fixedly attached together. At least one indicium can be formed on the core layer.

In another embodiment, the invention provides a security feature, comprising a first layer of ADVANTAGE material, the first layer having first and second sides and a layer of infrared material coating at least the first side of the ADVANTAGE material.

In still another aspect, the invention provides an identification document, comprising a layer of ADVANTAGE material, the layer having first and second sides, a core layer having first and second sides, a layer of adhesive material applied to at least the first side of the layer of ADVANTAGE material and coupling at least a portion of the ADVANTAGE material to the first side of the core layer, the adhesive material comprising an infrared material, and a substantially translucent layer of laminate disposed at the second side of the ADVANTAGE layer and along at least a portion of the first side of the core layer, the laminate substantially sealing the layer of ADVANTAGE material to the core layer. In one embodiment of this aspect, the core layer further comprises an indicium formed thereon and wherein the layer of ADVANTAGE material is positioned to overlay at least a portion of the indicium.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein:

FIG. 11 is a flow chart of a second method for manufacturing the ID document of FIG. 1 in the card production system of FIG. 10.

Figure 1:
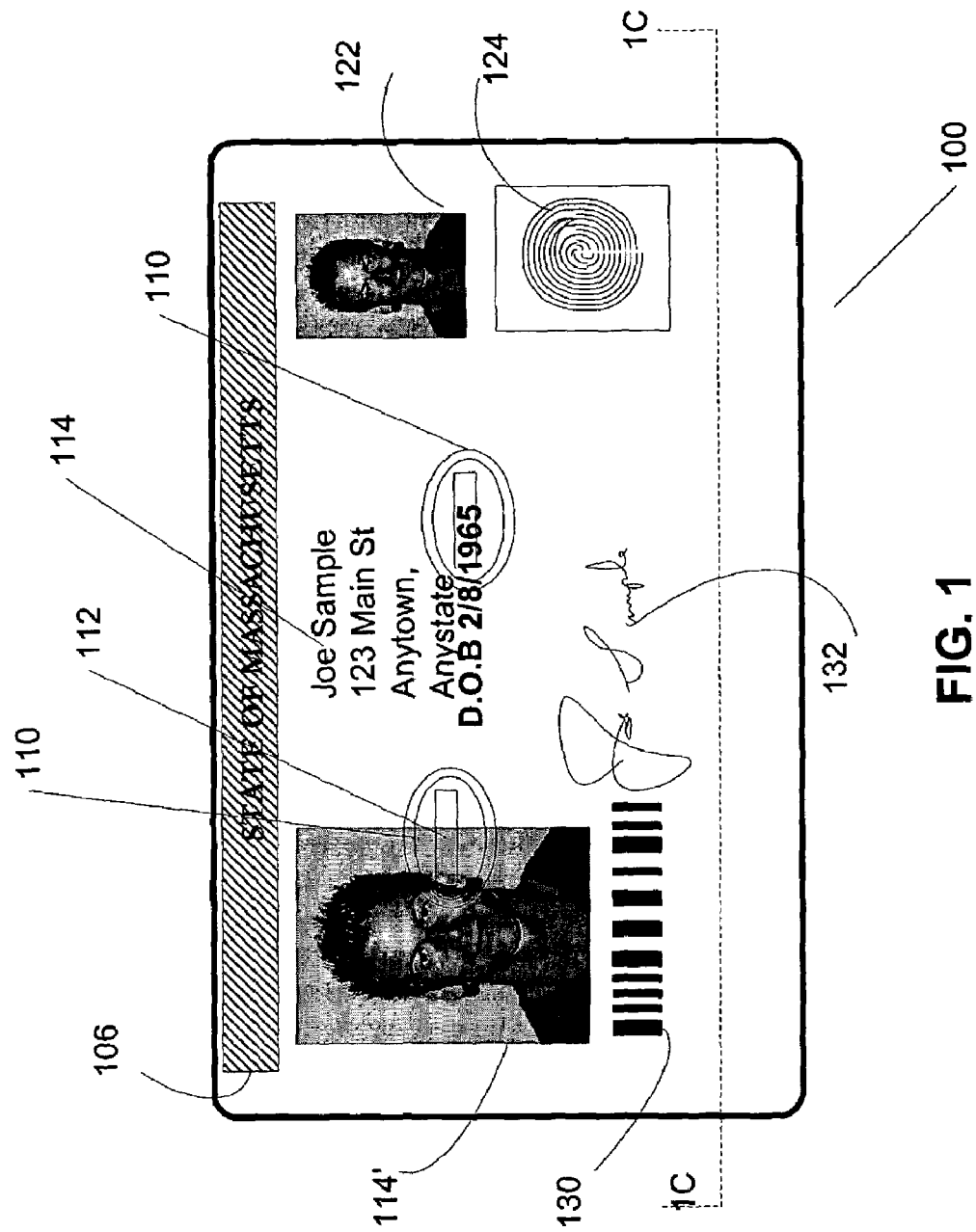
FIG. 1 is an illustration of an identification document in accordance with a first embodiment of the invention.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular format, arrangement, shape, outline, cross sectional shape, etc., (e.g., rectangular, elliptical) but that is provided by way of example and illustration only and is not limiting, nor is any format, arrangement, shape, outline, cross sectional shape, etc, intended to represent any actual resultant format, arrangement, shape, outline, cross sectional shape, etc, that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

"Optically variable" includes (but is not limited to) coatings, films, devices, foils, threads, etc., that exhibit a varying appearance depending on, e.g., the angle at which they are viewed, the type of light that is used to view the device (e.g., reflective light versus transmissive light, visible versus non-visible, etc). For example, so-called "color shifting" films, laminates, coatings, particles, threads, etc., which appear to have a first color (or set of colors, or lack of color(s)) when viewed at a first angle (or first type of light) and a different color (or set of colors, or lack of color(s)) when viewed at a second angle (or type of light) can all be said to be optically variable. Holograms, KINEGRAMS (available from Kurz OVD Kinegram in Switzerland), Exelgrams (available from CSIRO of Australia), PolaSecure™ (available from the assignee of the present invention), the ADVANTAGE material available from Advantage ID Technologies, Inc., and Tri-Color Polasecure™ (also available from the assignee of the present invention) are additional examples of materials that are optically variable. The materials described in the aforementioned U.S. Pat. No. 6,827,277 patent also are materials that are optically variable.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are will-known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. Patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways. For example, in at least some embodiments, the invention is usable with virtually any product, especially articles to which a film, laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

We also anticipate that the invention will have applicability to any document, article of manufacture or any situation or service in which it is desirable to trace the source of an article, document, or product (especially a counterfeit or altered product) and/or to detect tampering with an article, document, or product. Examples include (but are not limited to) pharmaceutical and drug products (especially packaging), foodstuffs, so-called "gray market" goods, imported goods of all kinds, copies of software, movies, and other media stored on compact disks (CD's) and/or digital versatile disks (DVDs), etc.

Referring now to FIG. 1, we illustrate of an identification document 100 in accordance with a first embodiment of the invention. The identification document 100 includes fixed indicia 106, security feature 110, first variable indicia 114 (e.g. variable personal information, such as address and birthdate), second variable indicia 114' (e.g., a photographic image of the bearer of the card, which image can be digitized and/or contain a digital watermark or other encoding), ghost image 122, biometric indicia 124 associated with the bearer of the card (which indicia is shown for illustrative purposes only to be a fingerprint, but which could be any biometric indicia, including information relating to retinal pattern, iris, hand geometric, template for facial recognition, etc), bar code 130 (which may contain information specific to the person whose image appears in the second variable indicia 114' and/or information that is the same from ID document to ID document), and signature 132. Although not illustrated in FIG. 1, the ID document 100 can include a magnetic stripe (which, for example, can be on the rear side (not shown) of the ID document 100), and various security features other than security feature 110, such as a hologram, security pattern printed in the background (for example, a printed pattern comprising a tightly printed pattern of finely divided printed and unprinted areas in close proximity to each other, such as a fine-line printed security pattern as is used in the printing of banknote paper, stock certificates, and the like) and/or a security pattern printed an overlaminate, etc.

The security feature 110 of FIG. 1, in one embodiment of the invention, comprises an optically variable, tamper indicating, covert, and forensically protected feature that is applied to a predetermined location of the identification document prior to or coincident with application of the final layer of laminate (e.g., overlaminate) to the identification document. In FIG. 1, two security features 110 are shown: one security feature 110 is illustrated as at least partially overlaying variable indicia 114 (namely, at the location of the birthdate) and the other security feature 110 is illustrated as at least partially overlaying variable indicia 114' (namely, the portrait of the bearer). It can be advantageous to locate the security feature 110 so that it is disposed on a location of the identification document 100 which is a likely target for tampering, forgery, and/or alteration, such as a location of variable indicia 114, 114', as is illustrated in FIG. 1.

The view of the security feature 110 in FIG. 1 is at an angle when the security feature 110 is substantially clear (as will be explained further below). It is also a view when the covert layer 112 (see FIGS. 2 and 3) of security feature 110 of the identification document 110 is appropriately stimulated so as to become visible. These views are explained further below.

Figure 2:
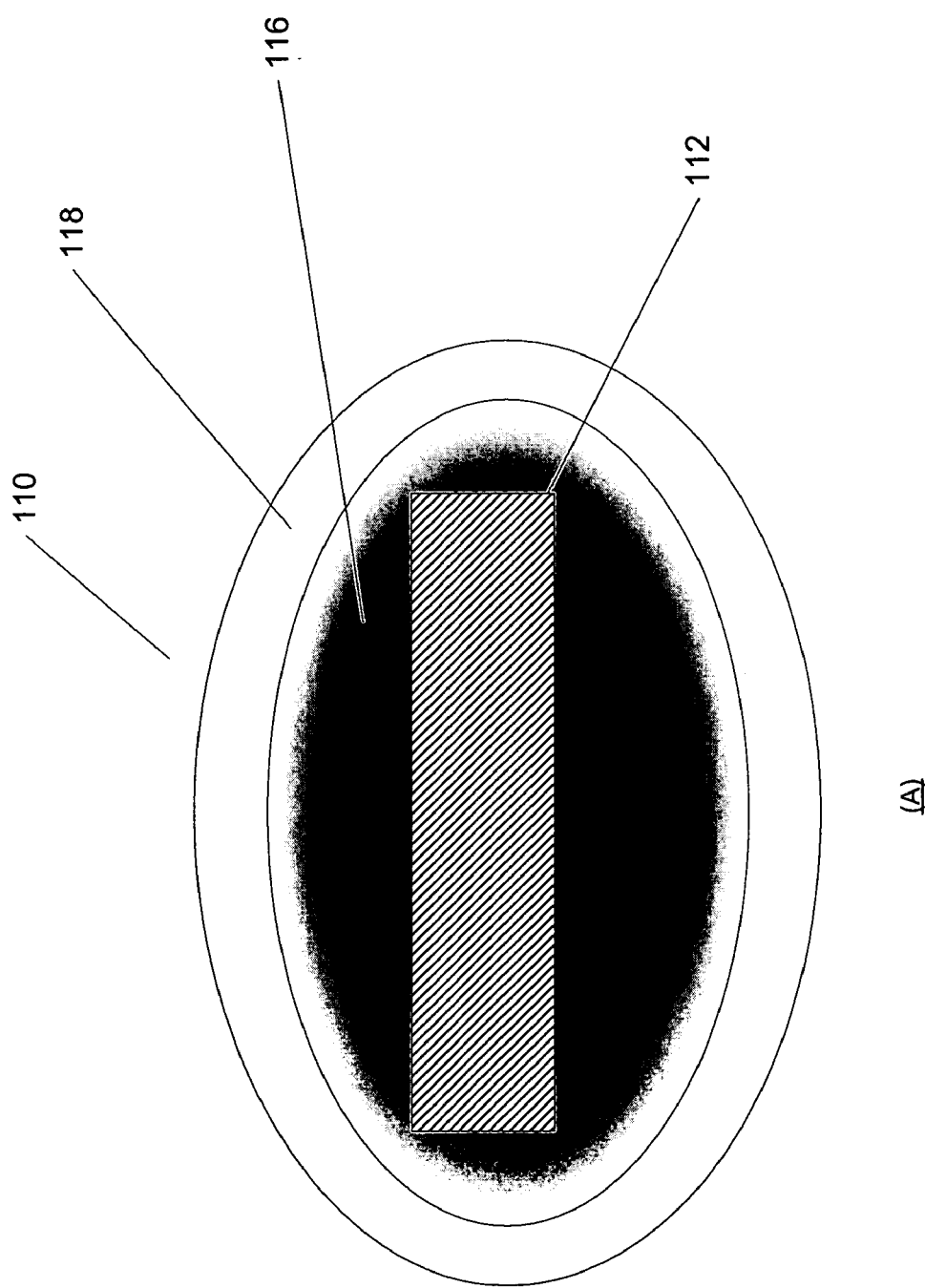
FIGS. 2A-2F are illustrations of an enlarged top view of the security feature of the identification document of FIG. 1, under various conditions.
Figure 2:
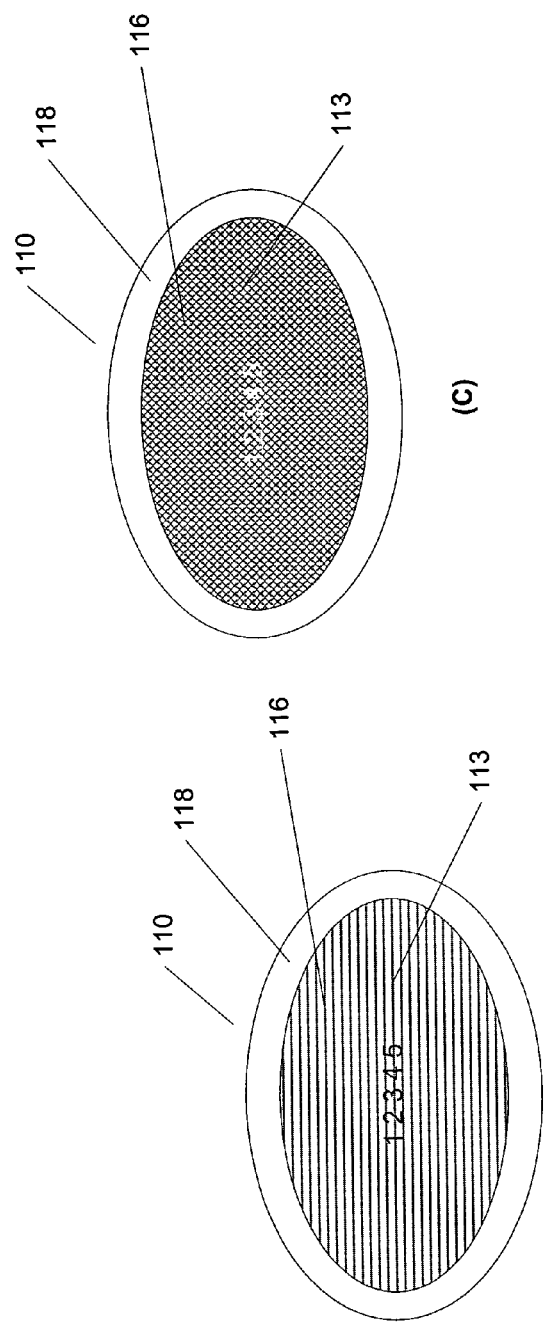
Figure 2:
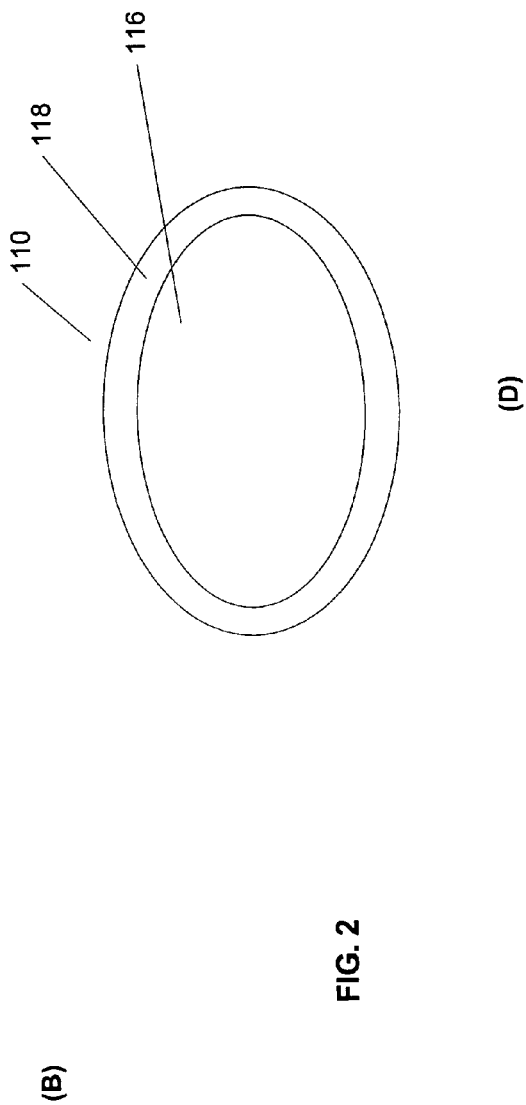
Figure 2:
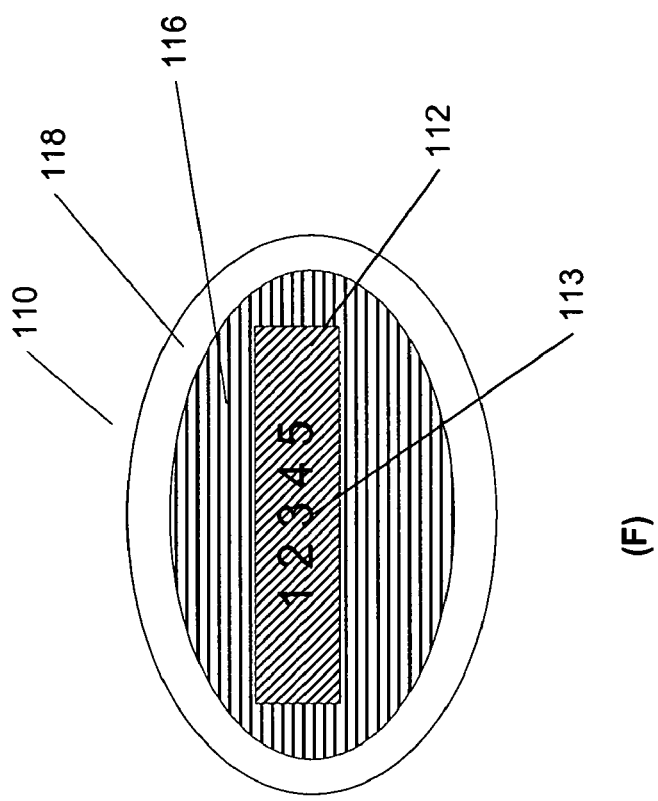
Figure 2:
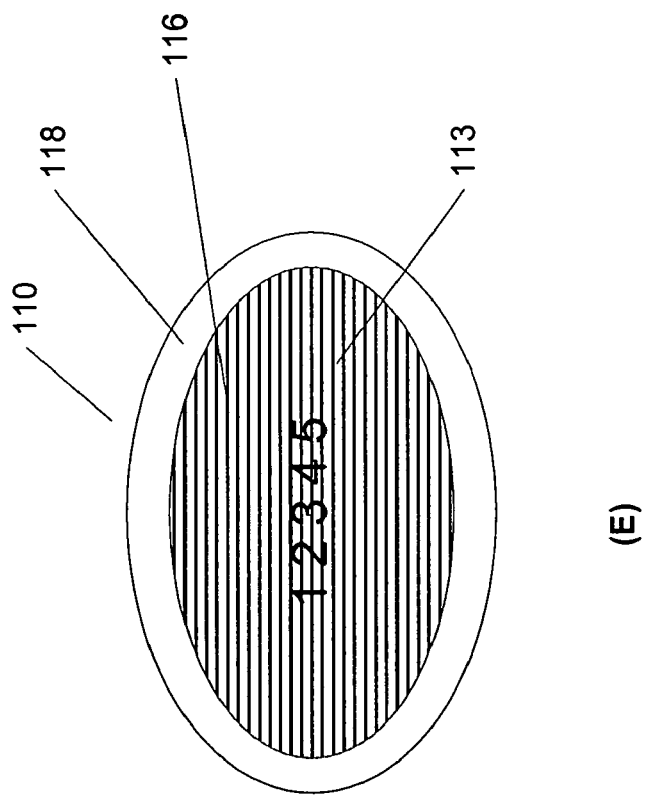

FIG. 2A is an enlarged close up view of the security feature 110 of FIG. 2 at a predetermined viewing angle, showing that the security feature 110 comprises a first covert layer 112, an optically variable layer 116, and a second covert layer 118. In this embodiment, the second covert layer 118 is transparent enough to permit the optically variable layer 116 to be visible (at appropriate viewing angles) to a naked eye, and to permit the first covert layer 112 to be visible under a condition appropriate to the given covert pigment in the layer 112 (e.g., under the appropriate frequency(ies) of light if the pigment in the first covert layer 112 is responsive to UV and/or IR light, at the appropriate temperature if the pigment in the first covert layer is thermachromic, etc.).

For illustrative purposes, the first covert layer 112 is shown in this view as if it is being stimulated by an appropriate stimulus (e.g., UV light). Additional views are shown and described in connection with FIGS. 2B-2F. In the embodiment of FIG. 2A, the optically variable layer 116 actually covers the first covert layer 112 and would actually "overlay" even a stimulated first covert layer 112, although such a quality is difficult to illustrate in FIG. 2A.

FIGS. 2B-2D illustrate the security feature 110 of FIGS. 1 and 2 at first, second, and third viewing angles, respectively. At the first viewing angle of FIG. 2B, the optically variable layer 116 is visible as a first color (illustrated by the series of horizontal lines), showing a first series of numbers 113 in a first color. At the second viewing angle of FIG. 2C, the optically variable layer 116 is visible as a second color (illustrated by the series of cross hatched lines) and the first series of numbers 113 is a second color. In an advantageous embodiment, the first color and the second color are two colors that are distinguishable from each other and visible to the naked eye, such as (e.g.), orange and green. At the third viewing angle of FIG. 2C, the optically variable layer 116 appears to be "clear" to the naked eye (it also can be a third color, such as blue) (note that the "clear" viewing angle was used to illustrate the security feature 110 in FIG. 1). At the clear viewing angle the series of numbers 113 is not visible.

FIG. 2E illustrates the security feature 110 at a first viewing angle and without appropriate stimulation to enable the covert layer 112 to be visible (e.g., without viewing the security feature 110 using predetermined wavelength(s) of UV or IR light, appropriate temperature, etc.) of the first covert layer 112. FIG. 2F illustrates the security feature 110 of FIG. 2E after application of the appropriate stimulation (i.e., viewed using appropriate wavelength of UV light, IR light, appropriate temperature, etc., as applicable. As FIG. 2F illustrates, the first covert layer 112 becomes visible with the appropriate stimulation.

Figure 3:
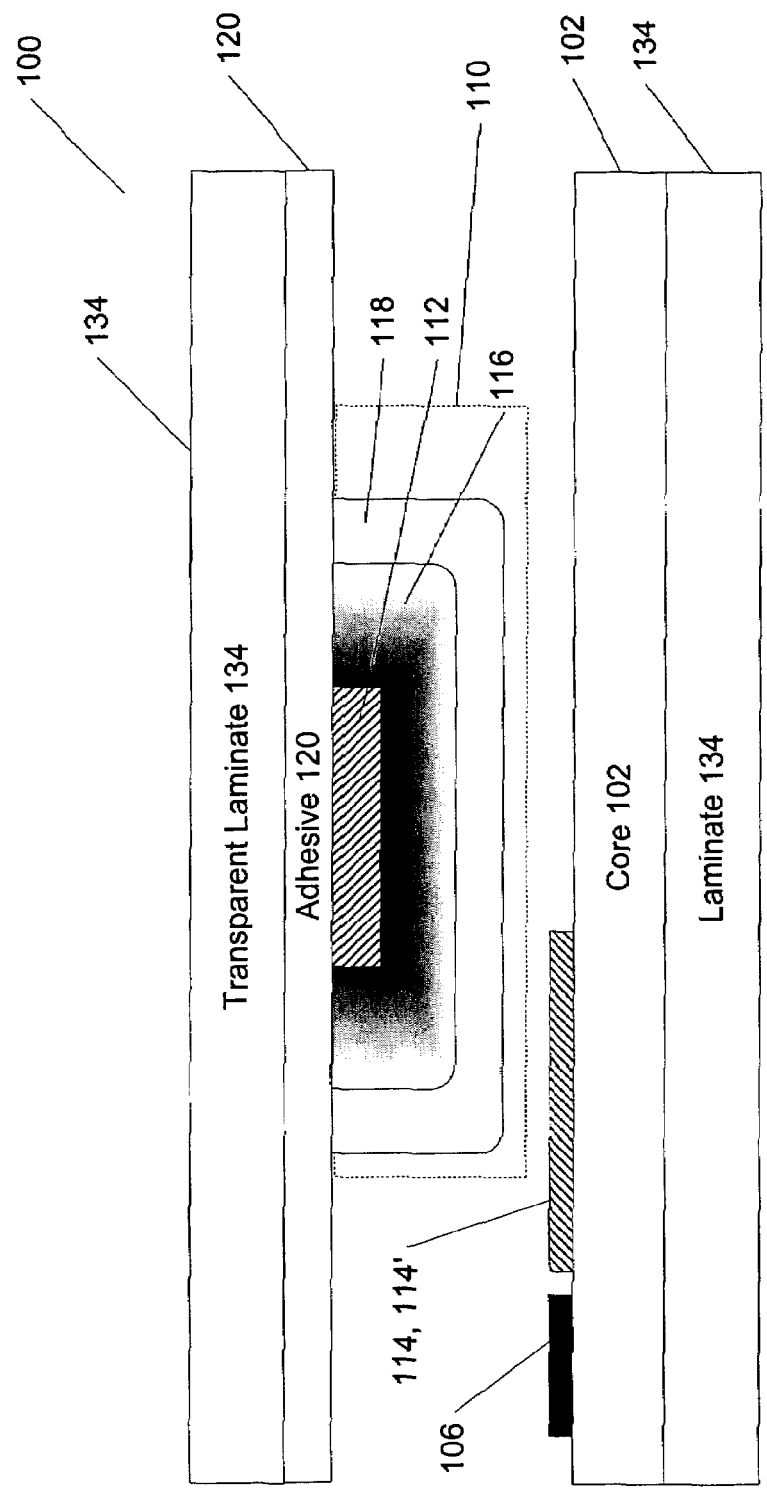
FIG. 3 is an exploded cross sectional view of the identification document of FIG. 1, taken along the line 1C-1C.
Figure 4:
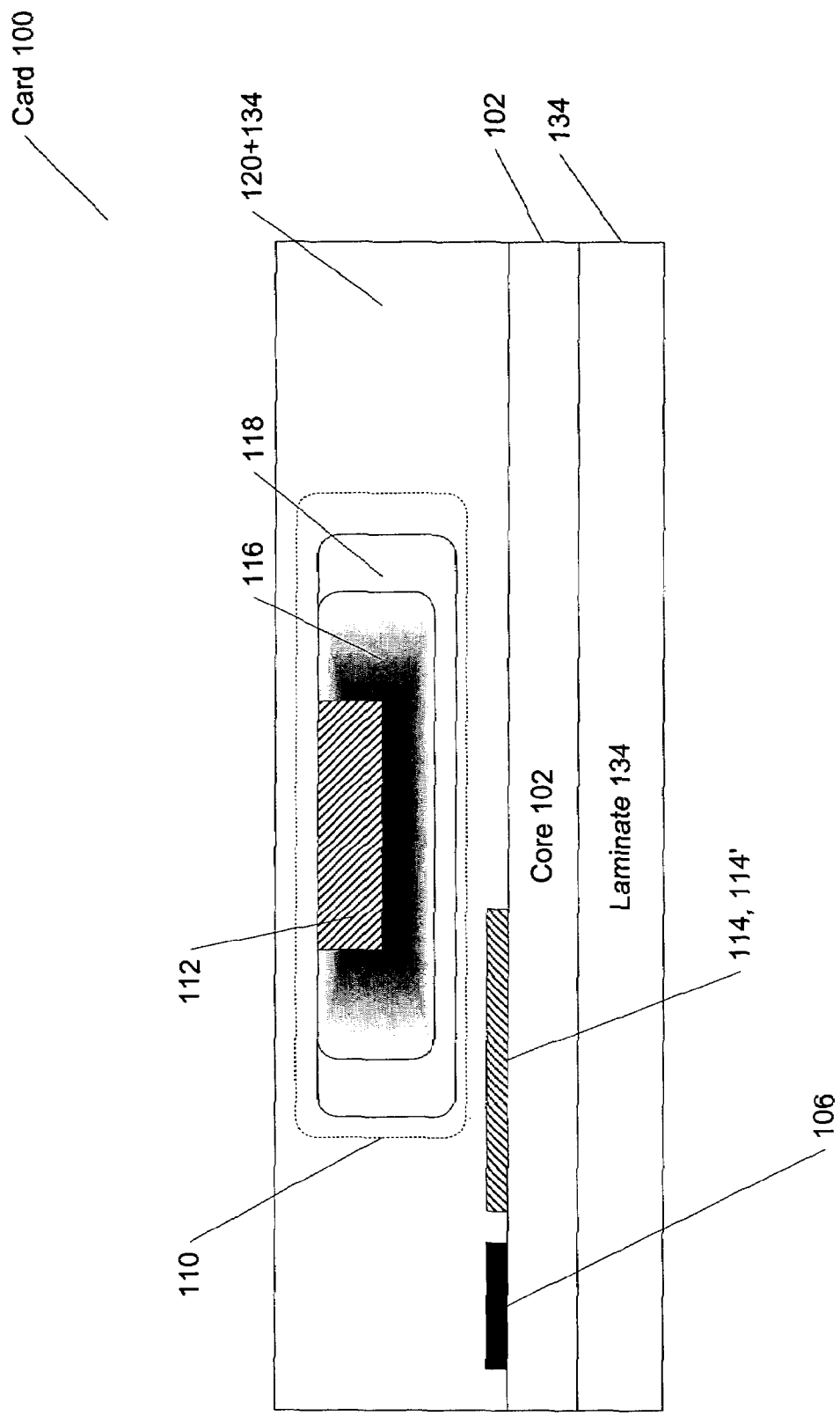
FIG. 4 is a cross sectional view of the identification document of FIG. 1, taken along the line 1C-1C, showing the identification document fully assembled.

FIG. 3 is an exploded cross sectional view of the identification document 100 of FIG. 1, taken along the line 1C-1C, and FIG. 4 is a cross sectional view of the identification document of FIG. 1, taken along the line 1C-1C, showing the identification document fully assembled. The security feature 110 is indicated in both FIGS. 2 and 4 by the dotted line. The embodiment of FIG. 4 illustrates that, after lamination, the adhesive 120 and transparent (or translucent) laminate 134 are substantially co-mingled, but those skilled in the art will understand that it is not required that the adhesive 120 and laminate 134 be mixed.

Referring to FIGS. 3 and 4, the core layer 102 is constructed and arranged to have fixed indicia 106 and variable indicia 114, 114' formed thereon. Those skilled in the art will appreciate that there are numerous known ways to form indicia on a security document, including but not limited to indigo (variable offset) laser xerography (variable printing), offset printing (fixed printing), D2T2, mass transfer, inkjet, and/or laser engraving, etc., and those methods are not detailed further here. Further, those skilled in the art will appreciate that certain core materials are more suitable for particular methods of forming indicia. For example, depending on the technique for forming indicia, core materials such as polycarbonate, TESLIN, TYVEC, MYLAR, MELINEX, polyolefin, polyester, polycarbonate, polystyrene, cellulose ester, polyolefin, polysulfone, polyvinyl chloride (PVC), polyethylene, polypropylene, and polyamide, amorphous polymer, and biaxially oriented polymer can be used to form the core material.

For purposes of illustration in this embodiment, it is assumed that the fixed indicia 106 and variable indicia 114, 114' are formed as part of a central issue process using a method such as indigo or laser xerography. It also is assumed that the core 102 comprises a substantially opaque material suitable for indigo or laser xerography printing thereon, such as a silica filled polyolefin like TESLIN.

Referring again to FIG. 3, the first covert layer 112 is a layer that is "breakable" (i.e., that becomes damaged) upon intrusion. Methods and materials for making such layers are known; see, e.g., U.S. Pat. No. 4,890,763, the contents of which are hereby incorporated by reference. The first covert layer 112 also comprises one or more pigments that are not normally visible to a human eye in ambient light conditions. Such a pigment can comprise, for example, ultraviolet pigments, infrared pigments, and/or thermachromic pigments. It is noted that damage to the covert layer 112 (such as results from an intrusion or an attempted intrusion) may only be visible when the appropriate conditions exist (e.g., light wavelength or temperature) that would permit the covert layer 112 to be visible to the human eye. In the embodiment, of FIGS. 1 and 3, the covert layer is shown for illustrative purposes only to have a rectangular shape; that shape is not, of course, limiting. The covert layer 112 can be structured and arranged to have any shape or form and/or to convey information, such as an indicium, if desired. In one advantageous embodiment, the covert layer 112 comprises an ultraviolet pigment.

Alternately, the covert layer 112 can comprise an tamper evident material capable of becoming damaged upon intrusion and which is itself substantially visible in ambient light, but which is coated with a sufficient quantity of material (e.g., an ultraviolet or infrared dye) that is itself not visible in ambient light to, render the covert layer 112 itself substantially invisible in ambient light.

The optically variable layer 116 comprises a layer of material that has a first appearance at a first angle of viewing and a second appearance at a second angle of viewing. The varying appearance can, for example, be a varying color (as shown in FIG. 2). In one embodiment, the optically variable layer 116 comprises a polymeric liquid crystal material. Other optically variable materials and devices, such as inks, pigments, holograms, the materials disclosed in the aforementioned U.S. Pat. No. 6,827,277 patent, etc., also may be usable. As is shown in FIG. 3, the optically variable layer covers at least one side of the first covert layer 112.

In one advantageous embodiment, it is possible to provide both the first covert layer 112 and the optically variable layer 116 by using a portion of the aforementioned ADVANTAGE security material. As those skilled in the art will appreciate, the ADVANTAGE material can be provided to identification documents in numerous ways, including as part of a patch, as a coating, as a label, as a seal, as a film, on a tape, etc.

Referring again to FIG. 3, a second covert layer 118 is applied over the optically variable layer 116 (or over the portion of ADVANTAGE material). In one embodiment, the second covert layer 118 comprises a substantially translucent film containing a second covert pigment that is substantially invisible to the naked eye in ambient light and/or ambient temperature conditions. The second covert layer 118 also can be, in one embodiment, a coating. In one embodiment, the second covert layer 118 is made using polyester material, such as the polyester materials and powder coatings generally available from Rohm Haas Corporation of Flying Hills, Pa. In an advantageous embodiment, the second covert layer 118 is selected to have an adhesion to both the core 102 and to a portion of ADVANTAGE material. The second covert layer 118 can also be made from any material capable of forming a coating on the selected optically variable layer 116 (or on the ADVANTAGE layer, if the embodiment is using the ADVANTAGE product), including polyester, polyolefin, polyethylene, polypropylene, polycarbonate, etc. The second covert layer 118 further comprises a second covert material, such as an infrared pigment, an ultraviolet pigment, or a thermachromic pigment. The second covert material is a material that becomes visible under appropriate stimulation.

For example, in one embodiment, the second covert material is an infrared ink or dye that fluoresces at one or more predetermined wavelengths of infrared light to produce an infrared feature. Use of infrared for security purposes is known. For example, Krutak et al. describe the use of near infrared fluorescent (NIRF) compounds used in polyester-based and polyester-amide based coatings and ink compositions which are used for marking articles for identification/authentication purposes, in U.S. Pat. No. 5,292,855 issued Mar. 8, 1994, U.S. Pat. No. 5,423,432, issued Jun. 13, 1995, and U.S. Pat. No. 5,336,714, issued Aug. 9, 1994. Krutak et al. also disclose tagging thermoplastic containers and materials with near infrared fluorescent compounds in U.S. Pat. No. 5,461,136 issued Oct. 24, 1995, U.S. Pat. No. 5,397,819, issued Mar. 14, 1995, and U.S. Pat. No. 5,703,229, issued Dec. 30, 1997. The use of near infrared fluorescent compounds as a security ink in thermal transfer printing has also been disclosed in International application WO 97/32733, published Sep. 12, 1997, wherein an image is formed by thermally transferring ink from a ribbon to paper. The disclosures of these patents and applications are hereby incorporated by reference.

Doing this can provide several advantageous embodiments of the invention. To improve security, knowledge of the presence of the second covert material can be kept from all but a few personnel and not known to the general public. This can help to make counterfeit identification documents (which may not contain the infrared feature) easier to detect. In addition, such an infrared dye is can be formulated to respond only to a very specific wavelength and/or intensity of infrared light (e.g., to respond only to a "secret" frequency or intensity of infrared light. This can help to further thwart even the counterfeiter who learns that infrared is being used on the security feature 10, but does not know that the infrared must be formulated to respond to a particular intensity and/or wavelength of infrared light. The second covert material 118 can even be formulated with an infrared ink or dye such that it is responsive only to a particular wavelength and/or intensity of infrared light. This may help to thwart a counterfeiter who attempts to use a broad spectrum infrared ink or dye.

Another advantage of embodiments that use infrared inks or dyes is that the availability of such infrared inks and dyes is more limited than for many other types of so-called "covert" inks and dyes (e.g., more limited than UV or thermachromic inks/dyes). Those skilled in the art are aware of the sources for infrared inks and dyes (many sources of which will sell their product only to authorized users). One source for infrared inks and dyes usable with at least some embodiments of the invention is Honeywell Corporation. Another source for infrared inks and dyes usable with at least some embodiments of the invention is any of the companies authorized to provide the infrared feature for the Euro currency that that became available in about 2003. By carefully controlling access and availability, responsive wavelength, responsive intensity, or other characteristics, the infrared pigment also can provide forensic advantages, especially in helping to detect and/or track counterfeit documents.

Those skilled in the art will appreciate that other types of covert pigments (e.g., UV and/or thermachromic inks and dyes) can be formulated and controlled in the same manner described above in connection with infrared pigments. It also will be appreciated that one or more covert pigments can be combined in any of the covert layers of the identification document 100.

Referring again to FIGS. 3 and 4, in one embodiment, a layer of adhesive 120 secures the security feature 110 to a layer of laminate 134 (which can be transparent or translucent, as desired). In one embodiment, the laminate 134 is biax polyester and the adhesive is a polyethylenic based hot melt adhesive. As will be described further below, affixing the security feature 110 to the layer of laminate 134 can simplify manufacture of the identification document 100 in some types of environments (e.g., some types of central issue type environments). However, it will be understood by those skilled in the art that the security feature 110 could be provided to the identification document in a number of other ways. For example, in one embodiment, the security feature 110 can be affixed first to the core 102, then the layer of laminate 134 (with or without adhesive 120) can be affixed over it, to laminate the security feature 110 to the identification document 100. In one embodiment, the security feature 110 is "stamped" on to the core 102 prior to lamination. In another embodiment, the separate components of the security feature 110 (e.g., first covert layer 112, optically variable layer 116, and second covert layer 118) can be separately provided and attached to the identification document 100, as part of the manufacture process. We even anticipate that the security feature 110 could be embedded within an aperture formed on the core 102, if desired.

In a further embodiment of the invention (not shown), the security feature 110 can further include additional covert features. For example, in one embodiment, the security feature 110 further comprises a covert feature that is hidden to the naked eye but visible using a commercial lens or using special software processing to simulate such a lens. In another embodiment, the security feature 110 further comprises a so-called "scrambled indicia" or "security indicia". Such indicia incorporates words or symbols that are concealed on a document and appear only when a specially grooved plastic viewer is moved across it. In a further embodiment, the security feature 110 further comprises microtaggants (either visible or non-visible), such as microscopic particles are color-coded, traceable, and traceable. Those skilled in the art will appreciate that virtually any type of additional security elements or features, whether covert or overt, can be incorporated into the security feature 110 of the invention.

Figure 5:
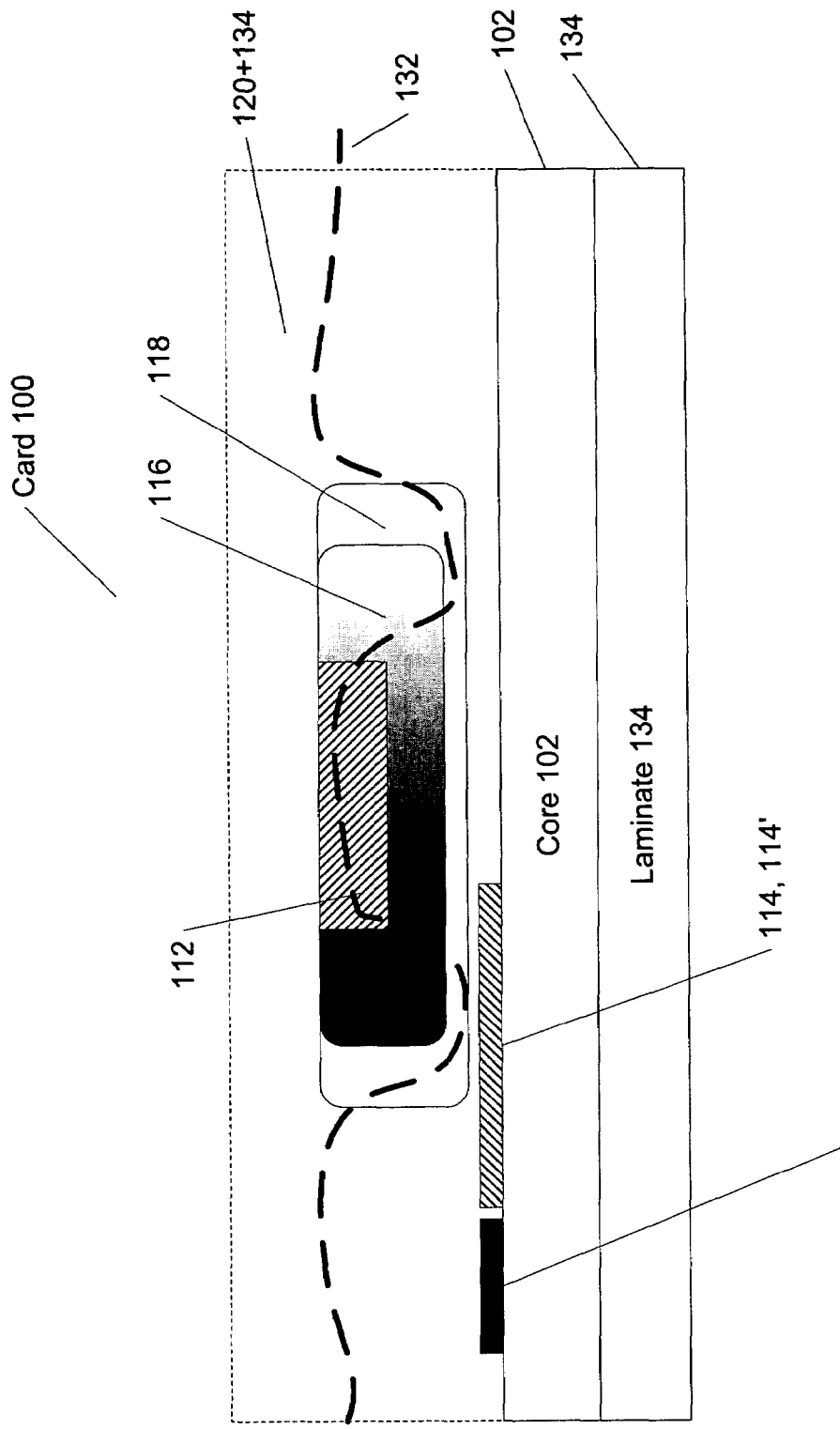
FIG. 5 is a cross sectional view of the identification document of FIGS. 1 and 4 showing the path along which an intrusion is made into the identification document.
Figure 6:
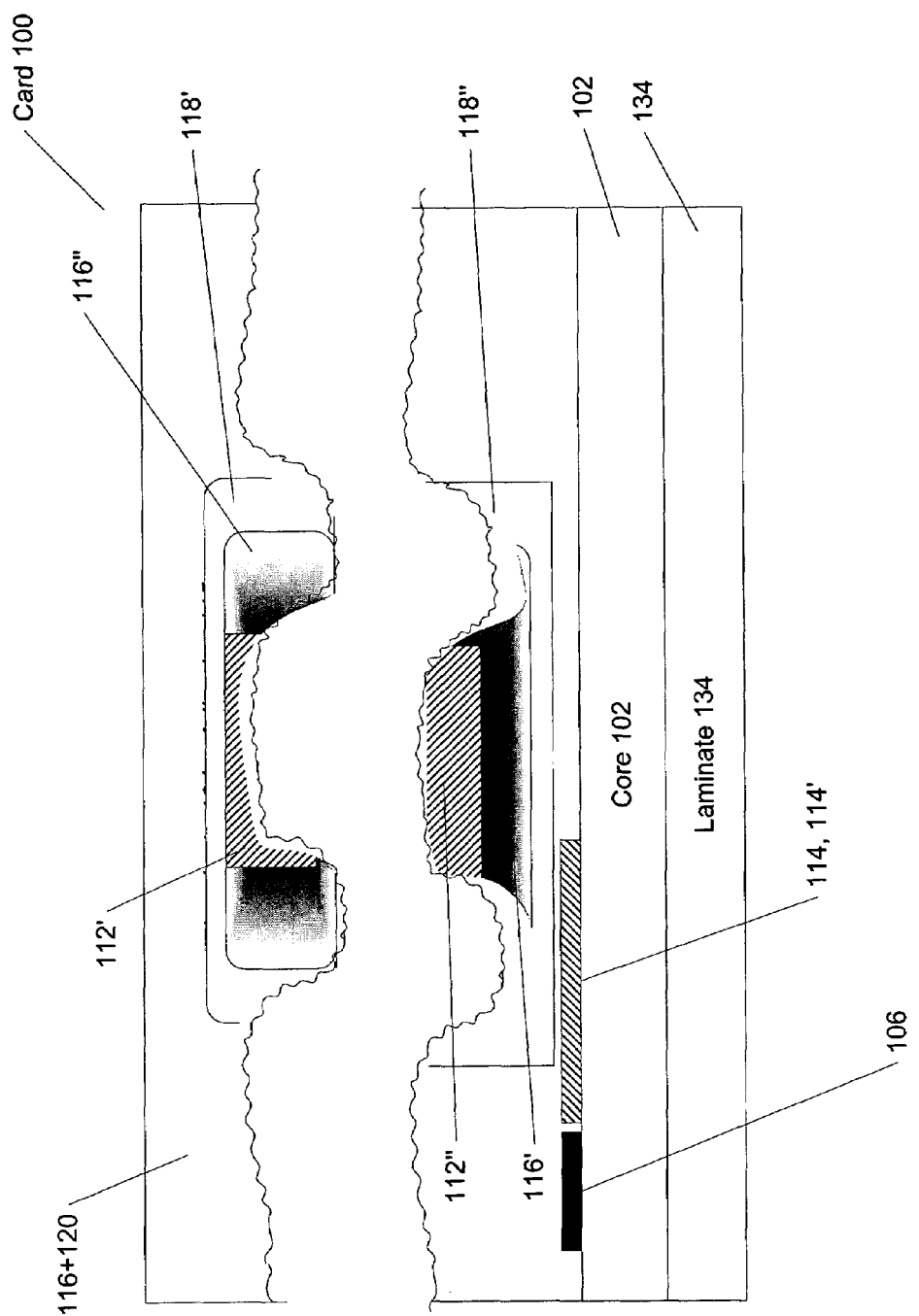
FIG. 6 is a cross section view of the identification document of FIGS. 1, 4, and 5 after the intrusion to the identification document has been made, showing the fracturing of the security feature.

As illustrated by FIGS. 5 and 6, in accordance with one embodiment of the invention, an attempt to intrude into the security feature 110 (such as might accompany an attempt to alter the variable indicia 114') will result in a partial or total destruction of the security feature 110 in a manner that is substantially irreparable and which can make substitution or alteration of the security feature to be detectable. In FIG. 5, the dotted line 132 shows, for illustrative purposes only, a path or breakage in the security feature 110 (this particular path of breakage is not, of course, limiting). As FIG. 6 indicates, the path of breakage effectively destroys the security feature 110. The optically variable layer 118, for example, is broken into at least two portions 116' and 116". Likewise, the second covert layer 118 is broken into at last two portions 118' and 118". In this illustration, the first covert layer 112 (which is a tamper evident layer) is illustrated also as breaking into two portions 112', and 112", but it will further be appreciated that the first covert layer 112 can be formulated to "shatter" or substantially fall apart into a plurality of pieces not shown here.

As shown in FIGS. 5 and 6, the pattern of breakage of the security feature helps to ensure that an attempt to falsify, replace, or "repair" the security feature 110 is likely to be detected, as well, for several reasons, including that (1) the optically variable feature is extremely difficult to replicate and is unlikely to appear the same after breakage and attempted reconnection; and (2) because of the presence of covert elements present in the security feature 110 (e.g., infrared pigments in second covert layer 118) which are not likely to be properly present in a falsified security feature, it becomes easier to detect forgeries.

Figure 7:
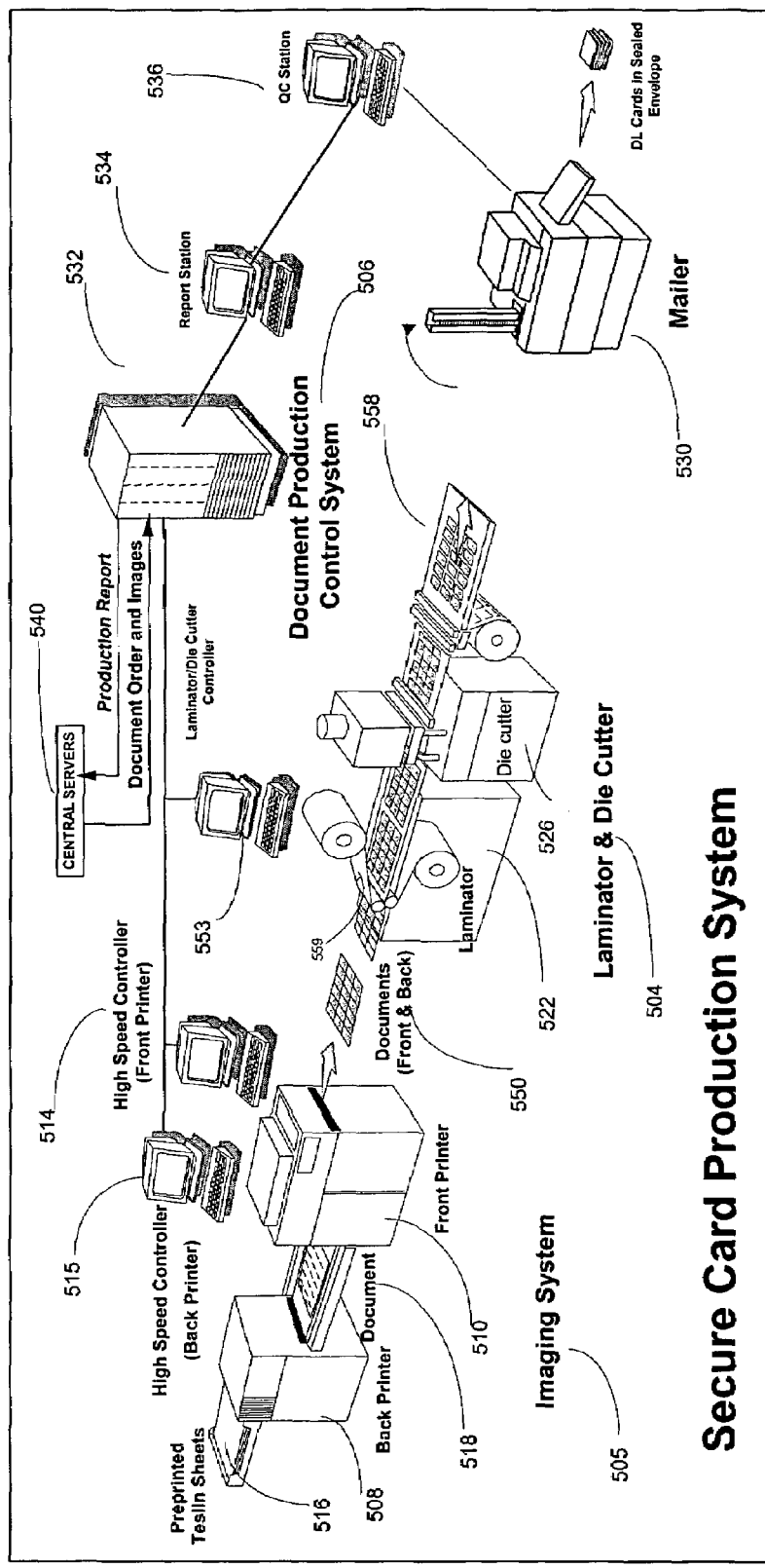
FIG. 7 is an illustrative diagram of a first central issue card production system that can be used to produce the ID document of FIG. 1, in accordance with one embodiment of the invention.

As noted previously, there are a number of different ways to manufacture an identification document 100 that incorporates the security feature 110 described herein. FIG. 7 is an illustrative diagram of a first central issue card production system that can be used to produce the identification document 110. In the system 500' of FIG. 7, the security feature is formed on a roll of laminate in advance, prior to the laminating of the laminate 134 to the core 102. See, for example, FIG. 8, which is an illustration of a portion of a laminate roll 800 showing a laminate with security features 110. Advantageously, the roll 800 of laminate 134 having security features 110 formed thereon also includes registration marks 812 within the laminate, to assist in accurately registering the security features 110 to the identification card 110. The sheet of laminate 800 in this example has been formed with divider lines 800 thereon, to further assist the later registration and lamination to the core layer 102. The dotted lines 810 are provided for illustrative purposes only (these lines are not necessarily on the laminate) to show where the divisions between identification documents 1100 will lie. A registration mark 812 is provided on one side of the laminate 800 also will assist when the laminate 800 is later coupled to the core 102. The roll of laminate 800 also can include guides 810 for cutting or dicing apart of the identification documents 100.

Refer again to FIG. 7, which provides an illustrative diagram of a first central issue card production system 500 that can be used to produce the identification document 100 of FIG. 1, in accordance with one embodiment of the invention. The system 500 includes an imaging system 505, laminator and die cutter system 504, and a document production and control system 506.

The imaging system includes a back printer 508 for printing the back side of the card and a front printer 510 for printing the front side of the card. Each printer has its own high speed controller 514, 515. The laminate and die cutter system 504 includes a laminator 522, a die cutter 558, and a laminator/die cutter controller 553. In one embodiment, the laminator/die cutter controller helps to implement the method of FIG. 9.

The document production control system includes central servers 540, a report station 534, a quality control station 536, and a mailer 530. The QC Station 536 and its associated bar code scanner (not shown) can be used by an operator to scan the bar code of a defective sheet or document. Keyboard entry can also be used to report or to check documents and sheets.

Production of the identification document 100 document begins at the Imaging System 505, where card substrates, such as preprinted TESLIN sheets 516, are fed into the back printer 508. The back sides of the TESLIN sheets 516 can be customized with desired information (e.g., restriction codes or other information unique to each document on the sheet). In addition, bar codes for tracking the documents through the production process can be added. As the TESLIN sheet enters the second section of the Imaging System 505, the front printer 510 prints appropriate portrait and signature images on the front of the documents based on personalized cardholder information stored in a file. The front printer 510 also prints the interlaced images (which, in one embodiment, comes from an interlaced image file accessible to the laminator/die cutter controller 553) on the front of the TESLIN sheets 516. Note that since a plurality of identification documents 100 documents are being produced simultaneously, the front printer 510 can print one or more indicia for each document onto the appropriate locations of the TESLIN sheets 516. The outputs of the front printer 510 are document sheets 550 printed on the front and back.

As completed sheets accumulate in the output hopper of the Imaging System 505, in one embodiment, an operator performs a visual inspection and transfers the completed sheets to the input hopper of the Laminating/Die-Cutting System 504. Any sheets failing visual inspection can be brought to the QC station 536 where their bar code is scanned and production of a replacement automatically ordered. The failed sheets are then destroyed.

Figure 8:
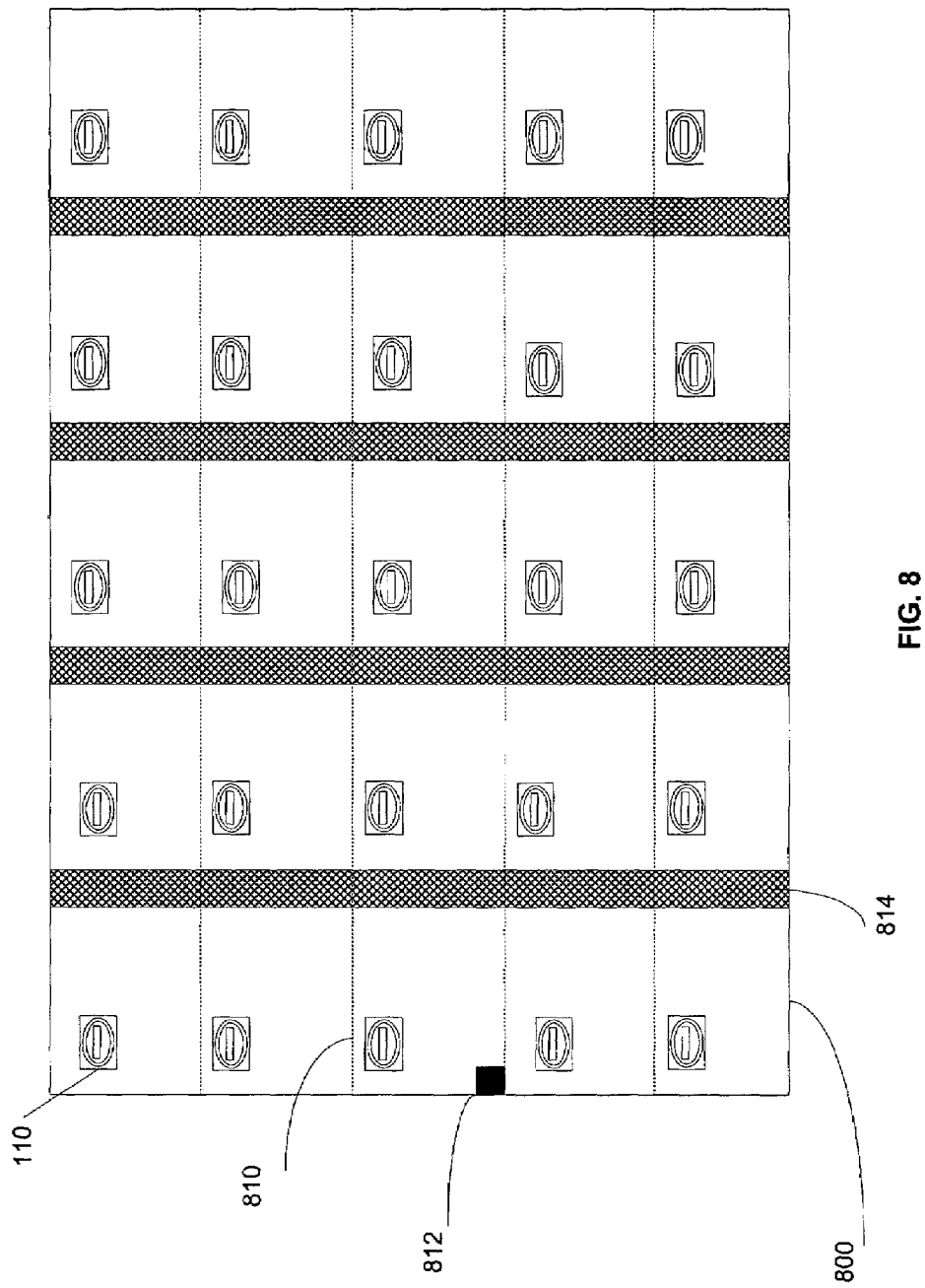
FIG. 8 is an illustration of a portion of a laminate roll usable with the system of FIG. 7, showing a laminate with security patches formed thereon.

When the document sheets 550 are about to enter the Laminating/Die-Cutting System 504, automatic scanners confirm that the front and back sheets 550 match, that sheets 550 have not stuck together, and that the sheets 550 are right side up. After the scanning process, the laminator 522 applies the desired laminate material (e.g., polyester) on both sides (front and back) material to all sheets to form a continuous web of laminated sheets (the laminate material would include the security features 110, as shown in FIG. 8). In at least one embodiment, registration marks printed on one or both sides of the sheets 550 help to precisely orient the laminate so that the security feature 110 feature is correctly aligned to at least partially overlay variable indicia 114 formed on the identification document 100.

Figure 9:
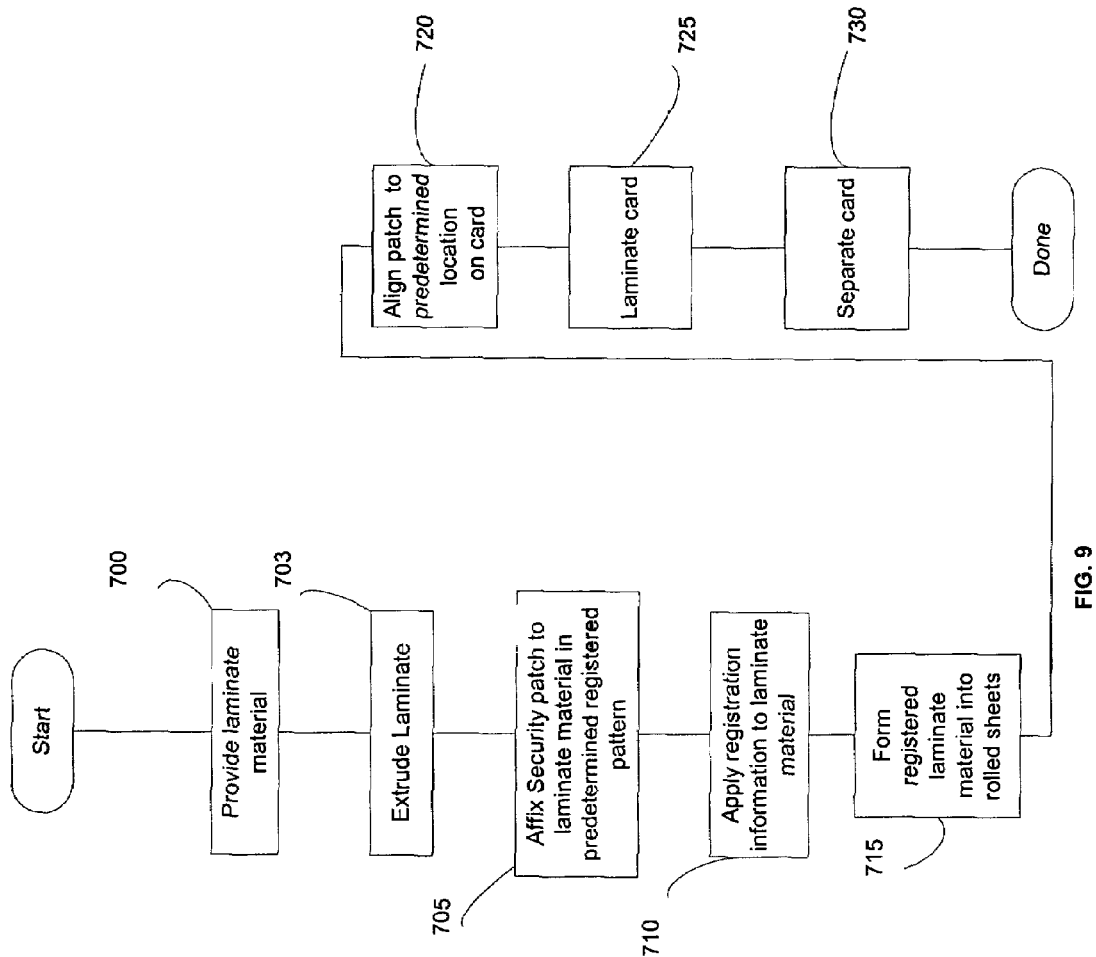
FIG. 9 is a flow chart of a first method for manufacturing the ID document of FIG. 1 using the system of FIG. 7, in accordance with one embodiment of the invention.

The web of laminated sheets leaves the laminator 522 and then passes into the die cutter 558, which cuts the sheet into individual documents. After the identification documents 100 documents are produced and given a final quality control inspection, they are fed into the mailer 530. The mailer prints the applicant's address on the card holder and inserts the ID document into the holder. The holder is then inserted into an envelope for mailing FIG. 9 is a flow chart of a first method for manufacturing the identification document 100 document of FIG. 1 using the system of FIG. 7, in accordance with one embodiment of the invention. The detailed description of these method steps already has been done in connection with the description accompanying FIGS. 9 and 13, and is not repeated here.

Figure 10:
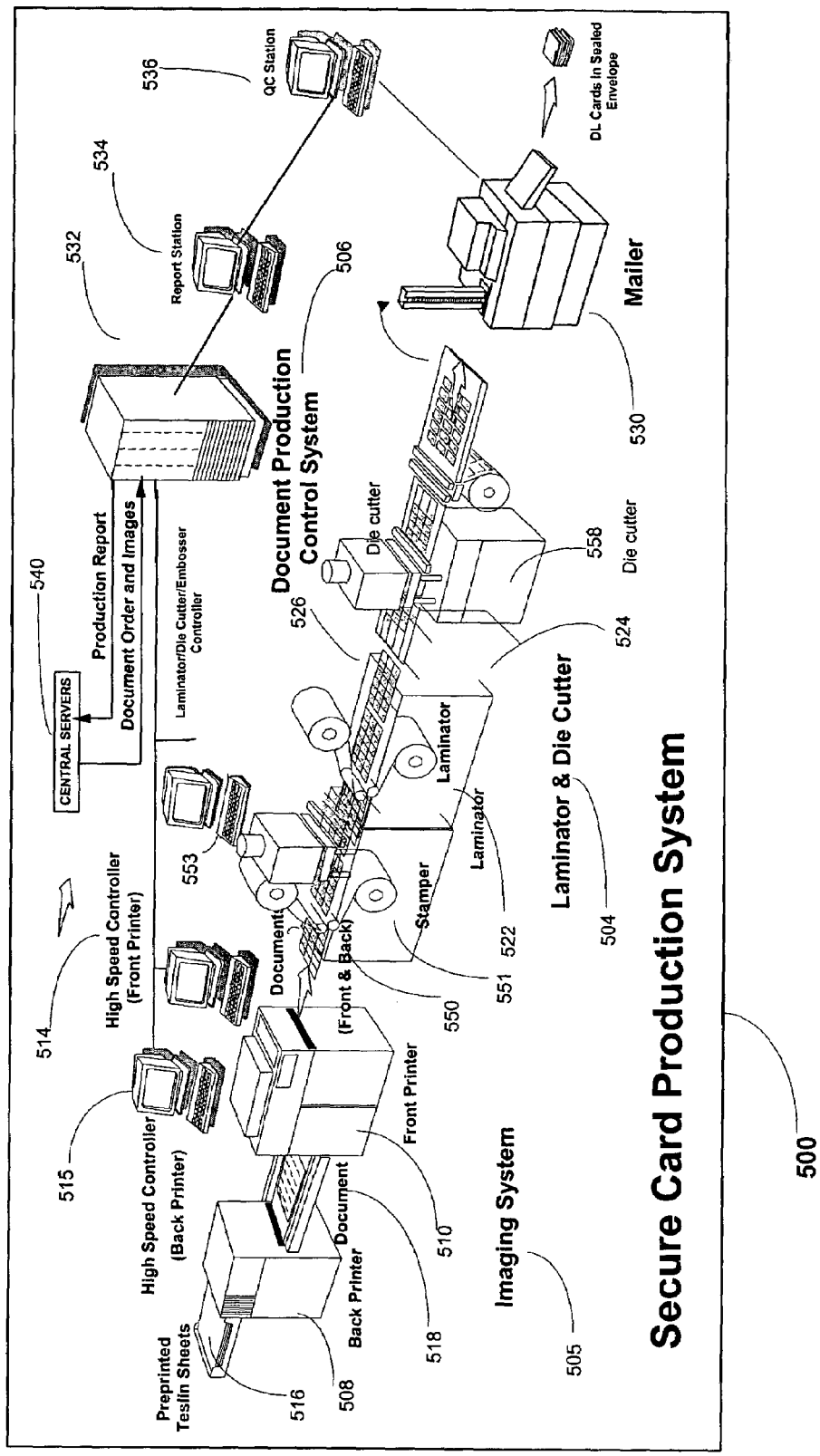
FIG. 10 is an illustrative diagram of a second central issue card production system that can be used to produce the ID document of FIG. 1, in accordance with one embodiment of the invention.

As mentioned previously, the security feature 110 also can be "stamped" or embossed onto the identification documents 100 prior to lamination. FIG. 10 is an illustrative diagram showing how the central issue production system of FIG. 7 could be altered to accommodate a stamping/embossing process. A stamper 551 is disposed in the process after printing and before lamination by the laminator 522. The security feature 110 is applied to the identification document after is it printed, but prior to lamination. All other process steps are substantially the same as described for FIG. 7. FIG. 11 is a flow chart of the method used in connection with FIG. 11.

Digital Watermarking

In one embodiment of the invention, we embed a steganographic code into the security feature 10. The steganographic code can be embedded in the optically variable layer 116, the first covert layer 112, and/or the second covert layer 118. It is particularly advantageous to embed the steganographic code into a graphical image that may be formed in any of these three layers. The code can be embedded in the master image, e.g., a facial image. Or the code can be embedded in perceptually significant features, e.g., facial outlines, hair, etc. that are able to survive the processing described herein. We also envision that steganographic code can, of course, be embedded into either or both of the variable data 114 portrait image and/or the ghost image 122.

One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some embodiments, the identification document includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from conventional PC-connected cameras and computers to fully mobile readers with built-in displays. By imaging a watermarked surface of the card, the watermark's "payload" can be read and decoded by this reader.

Several particular digital watermarking techniques have been developed. The reader is presumed to be familiar with the literature in this field. Some techniques for embedding and detecting imperceptible watermarks in media signals are detailed in the assignee's U.S. patent application Ser. No. 09/503,881 (now U.S. Pat. No. 6,614,914), U.S. Pat. No. 6,122,403 and PCT patent application PCT/US02/20832, which are each herein incorporated by reference.

In one embodiment, the watermark embedded in the image may include a payload or message. The message may correspond, e.g., to the ID document number, printed information, issuing authority, biometric information of the bearer, and/or database record, etc. The watermark embedded in the image may also include an orientation component, to help resolve image distortion such as rotation, scaling and translation. In at least one embodiment of the invention, we embed two or more watermarks in the OVD image.

In further embodiments, the watermark embedded in the image corresponds to information printed elsewhere on the identification document 100, or to information carried by a second watermark embedded elsewhere on the identification document 100 (e.g., background pattern, fixed indicia 106, etc.). More techniques for digital watermarks and ID cards can be found in Digimarc's U.S. Provisional Patent application No. 60/421,254, U.S. patent application Ser. No. 10/094, 593, and in U.S. Pat. No. 5,841,886. Each of these patent documents is incorporated herein by reference. We expressly contemplate that the techniques disclosed in this application can be combined with the aspects of the present invention.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use infrared, UV, and/or thermachromic inks and/or dyes by way of example, the present invention is not so limited. Our inventive techniques and methods can be used with other types of fluorescing and/or covert inks and dyes as well.

It should be appreciated that the methods described above with respect to FIGS. 1-11, as well as the methods for implementing and embedding digital watermarks, can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software embodying aspects of the invention can be stored on a computer readable media, such as a diskette, removable media, DVD, CD, hard drive, electronic memory circuit, etc.).

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption, etc.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A security feature, comprising:
   a first covert layer comprising a first covert material that is not visible to a human eye except under a first condition in which the first covert material is stimulated by a source other than visible light, the first covert layer further comprising a material constructed and arranged to produce, upon an attempted intrusion into any part of the security feature, a first effect that is visible at least under the first condition;
   an optically variable layer comprising an optically variable material and having first and second sides, the first side being disposed adjacent the first covert layer, the optically varying layer being constructed and arranged to cover at least a portion of the first covert layer; and a second covert layer disposed adjacent to the second side of the optically variable layer, the second covert layer being constructed and arranged to cover at least a portion of the optically variable layer, the second covert layer comprising a second covert material that is visible to the human eye only at a second condition.

2. The security feature of claim 1 wherein the first effect comprises at least one of damaging breaking, cracking, rupturing, splitting, fracturing, splintering, changing color, changing texture, shattering, and destroying, of the first layer upon an attempted intrusion into any part of the security feature.

3. The security feature of claim 1, wherein the second covert material comprises at least one of an infrared, an ultraviolet, and a thermachromic material.

4. The security feature of claim 1 wherein the second condition comprises at least one of a predetermined wavelength of light in the infrared range, a predetermined wavelength of light in the ultraviolet range, and a predetermined temperature.

5. The security feature of claim 1 wherein the first covert material comprises at least one of an infrared pigment, an ultraviolet pigment, and a thermachromic pigment.

6. The security feature of claim 1 wherein the first condition comprises at least one of a predetermined wavelength of light in the infrared range, a predetermined wavelength of light in the ultraviolet range, and a predetermined temperature.

7. The security feature of claim 1, wherein the optically variable material comprises a polymeric liquid crystal.

8. The security feature of claim 1, wherein the second covert layer comprises an adhesive selected to adhere the security feature to an identification document.

9. The security feature of claim 1 wherein the resultant security feature comprises first and second sides and, when viewed from a first side of the security feature, the optically variable layer substantially covers the first covert layer.

10. The security feature of claim 1 wherein the resultant security feature comprises first and second sides and, when viewed from a first side of the security feature, the second covert layer substantially covers the first optically variable layer.

11. The security feature of claim 9 wherein the resultant security feature comprises first and second sides and, when viewed from a first side of the security feature, the second covert layer substantially covers the first optically variable layer.

12. The security feature of claim 1 wherein at least one of the first covert layer, second covert layer, and optically variable layer further comprises at least one indicium.

13. The security feature of claim 1 wherein the first covert layer is operably coupled to the optically variable layer and is constructed and arranged such that an attempted intrusion into the first covert layer causes damage to at least one of the first covert layer and the optically variable layer.

14. The security feature of claim 1 wherein ADVANTAGE material is used for at least one of the optically variable layer and the first covert layer.

15. The security feature of claim 1 wherein the first and second covert layers and the optically variable layer are constructed and arranged such that an attempted intrusion into the security feature causes damage to at least a portion of at least one layer of the first covert layer, second covert layer, and optically variable layer.

16. The security feature of claim 15 wherein the damage is substantially visible to the naked eye when the damaged layer is subject to an appropriate condition that normally would enable the naked eye to see the layer before the layer was damaged.

17. An identification document, comprising
a core layer having first and second sides;
a security feature having first and second sides, the first side being operably coupled to the first side of the core layer, the security feature comprising:
   a first covert layer comprising a first covert material that is not visible to a human eye except under a first condition in which the first covert material is stimulated by a source other than visible light, the first covert layer further comprising a material constructed and arranged to produce a first effect that is visible at least under the first condition upon an attempted intrusion into the first covert layer;
   an optically variable layer comprising an optically variable material and having first and second sides, the first side being disposed adjacent the first covert layer, the optically varying layer being constructed and arranged to cover at least a portion of the first covert layer; and
   a second covert layer disposed adjacent to the second side of the optically variable layer, the second covert layer being constructed and arranged to cover at least a portion of the optically variable layer, the second covert layer comprising a second covert material that is visible to the human eye only at a second condition; and
a first laminate layer operably coupled to the second side of the security feature.

18. The identification document of claim 17, wherein the core layer has at least one indicium formed thereon and the security feature is disposed so as to overlay at least a portion of the indicium.

19. The identification document of claim 18, wherein the indicium is at least one of a variable and a fixed indicium.

20. The identification document of claim 17 wherein the second covert layer comprises at least one of a laminate, an adhesive, and a coating capable of securing at least a portion of the security feature to the core layer.

21. The identification document of claim 17 wherein the laminate layer substantially seals the security feature to the core layer.

22. The security feature of claim 17 wherein the laminate, core layer, first and second covert layers and the optically variable layer are constructed and arranged such that an attempted intrusion into the security feature causes damage to at least a portion of at least one layer of the laminate layer, first covert layer, second covert layer, optically variable layer, and core layer.

23. The security feature of claim 17 wherein the core layer comprises at least one of polycarbonate, TESLIN material, TYVEC material, MYLAR material, MELINEX material, polyolefin, polyester, polycarbonate, polystyrene, cellulose ester, polyolefin, polysulfone, polyvinyl chloride (PVC), polyethylene, polypropylene, and polyamide, amorphous polymer, and biaxially oriented polymer.

24. The identification document of claim 17 wherein the laminate layer comprises at least one of polyester, polycarbonate, polystyrene, cellulose ester, polyolefin, polysulfone, polyvinyl chloride (PVC), polyethylene, polypropylene, and polyamide, amorphous polymer, and biaxially oriented polymer.

25. The identification document of claim 17, wherein the second covert material comprises at least one of an infrared pigment, an ultraviolet pigment, and a thermachromic pigment.

26. The identification document of claim 17 wherein the second condition comprises at least one of a predetermined wavelength of light in the infrared range, a predetermined wavelength of light in the ultraviolet range, and a predetermined temperature.

27. The identification document of claim 17 wherein the first covert material comprises at least one of an infrared pigment, an ultraviolet pigment, and a thermachromic pigment.

28. The identification document of claim 17 wherein the first condition comprises at least one of a predetermined wavelength of light in the infrared range, a predetermined wavelength of light in the ultraviolet range, and a predetermined temperature.

29. The identification document of claim 17, wherein the optically variable material comprises a polymeric liquid crystal.

30. A method of making an identification document, comprising:

provinding a first laminate layer having first and second sides;

disposing the first side of a first covert layer having first and second sides adjacent to the first side of a the first laminate layer;

arranging a first side of an optically variable layer having first and second sides adjacent to the second side of the first covert layer;

placing a first side of a second covert layer having first and second sides adjacent to the second side of the optically variable layer;

aligning a first side of a core layer having first and second sides to the second side of the second covert layer; and fixedly attaching together the first laminate layer, first covert layer, optically variable layer, second covert layer, and core layer, the first covert layer comprising a material that is not visible in response to visible light stimuli.

31. The method of claim 30 further comprising forming at least one indicium on the core layer.

32. The method of claim 31 wherein the indicium is formed on the core layer before the core layer is fixedly attached to the other layers.

* * * * *